United States Patent [19]

Michalek

[11] 4,263,033
[45] Apr. 21, 1981

[54] METHOD AND APPARATUS FOR COLLECTING MINERAL FIBERS

[75] Inventor: Jan K. Michalek, Newark, Ohio

[73] Assignee: Owens-Corning Fiberglas Corporation, Toledo, Ohio

[21] Appl. No.: 107,301

[22] Filed: Dec. 26, 1979

[51] Int. Cl.³ ............................................. C03B 37/04
[52] U.S. Cl. .......................................... 65/4 R; 65/9; 65/29; 156/62.4
[58] Field of Search .......................................... 65/6–8, 65/14–16, 4 R, 9, 29; 156/62.4

[56] References Cited

U.S. PATENT DOCUMENTS 3,539,316  11/1970  Trethewey ........................... 65/29 X
4,061,485  12/1977  Rimmel ................................ 65/14 X

FOREIGN PATENT DOCUMENTS 50259  7/1978  U.S.S.R. ...................................... 65/29

Primary Examiner—Robert L. Lindsay, Jr.
Attorney, Agent, or Firm—Ronald C. Hudgens; Philip R. Cloutier; Ted C. Gillespie

[57] ABSTRACT

A method and apparatus for collecting mineral fibers comprises a moving surface for receiving a flow of fibers, sensing means for sensing the speed of said moving surface, control means for generating a signal in response to the sensed speed of the moving surface, and means for intermittently directing gases into the flow of mineral fibers in response to the signal.

8 Claims, 3 Drawing Figures

METHOD AND APPARATUS FOR COLLECTING MINERAL FIBERS

TECHNICAL FIELD

This invention relates to distributing mineral fibers onto a collection surface to form a uniformly collected pack of mineral fibers, such as glass fibers. In one of its more specific aspects, this invention relates to deflecting a cylindrical veil of mineral fibers to form a uniformly distributed pack of the mineral fibers.

BACKGROUND OF THE INVENTION

A common method for forming mineral fibers involves supplying molten mineral material to a centrifuge having a plurality of holes in its peripheral wall, and centrifuging the mineral material through the peripheral wall to form fibers. The fibers can be further attenuated with a blower or a combustion chamber burner, or can be merely deflected downwardly by a non-attenuating blower to form a generally cylindrical veil of fibers. It is desirable to distribute the fibers uniformly across the width of the collecting surface, and it is a common practice to utilize nozzles emitting air or steam blasts to periodically deflect the veil for distribution of the fibers into a wider pack.

One of the problems associated with the fiber deflection systems of the prior art is that there is no coordination between the operation of the veil deflecting apparatus and the speed of the moving collecting surface. In mineral wool fiberizing systems having a plurality of fiberizers to direct fibers onto one collecting surface, the addition or deletion of one or more fiberizers usually requires an increase or decrease in the speed of the moving collecting surface. Changes in the speed of the collecting surface without resulting changes in the pattern of deflecting the fibers onto the collecting surface can result in degradation of the uniformity of the pack of mineral fibers. The present invention is directed toward a system for collecting mineral fibers in which the deflection of the veils of fibers is accomplished in response to the speed of the collecting surface.

SUMMARY OF THE INVENTION

According to this invention there is provided apparatus for collecting mineral fibers comprising a moving surface for receiving a flow of mineral fibers, sensing means for sensing the speed of the moving surface, control means for generating a signal in response to the sensed speed of the moving surface, and means for intermittently directing gases into the flow of mineral fibers in response to the signal.

In one embodiment of the invention, the sensing means comprises a tachometer producing a voltge signal.

In another embodiment of the invention, the control means comprises a voltage-to-frequency converter.

In a preferred embodiment, the invention comprises duty ratio control means for controlling the duration of each pulse during each cycle of a pulse signal.

In a more preferred embodiment of the invention, the duty ratio control means is adapted to enable the pulse duration percentage of the pulse signal to be preselected in increments of 1%.

In a preferred embodiment, the invention comprises a conveyor for receiving mineral fibers from more than one veil of mineral fibers, sensing means for sensing the speed of the conveyor, control means for generating a pulse signal, the frequency of the pulse signal being in response to the sensed speed of the conveyor, duty ratio control means for controlling the duration of each pulse during each cycle o the pulse signal, and means for intermittently directing gases into the veils of mineral fibers in response to the pulse signal.

In another preferred embodiment, the control means comprises means for dividing a frequency signal from pulses/second to pulses/minute.

In a more preferred embodiment, the control means comprises means for indexing each 100th pulse from the means for dividing.

In a most preferred embodiment, the duty ratio control means can comprise a pulse counter.

Also according to this invention, there is provided a method for collecting mineral fibers comprising directing a flow of mineral fibers onto a moving surface, sensing the speed of the moving surface, generating a signal in response to the sensed speed of the moving surface, and intermittently directing gases into the flow of mineral fibers in response to the signal.

In one embodiment, the invention comprises sensing the speed of the moving surface with a tachometer to produce a voltage signal.

In another embodiment, the invention comprises converting the voltage signal to a frequency signal.

In its most preferred embodiment, the invention comprises a method for collecting mineral fibers comprising directing more than one veil of mineral fibers onto a moving surface, sensing the speed of the moving surface, generating a pulse signal, the frequency of the pulse signal being in response to the sensed speed of the moving surface, controlling the duration of each pulse during each cycle of the pulse signal, and intermittently directing gases into the veils of mineral fibers in response to the pulse signal.

DESCRIPTION OF THE INVENTION

Figure 1:
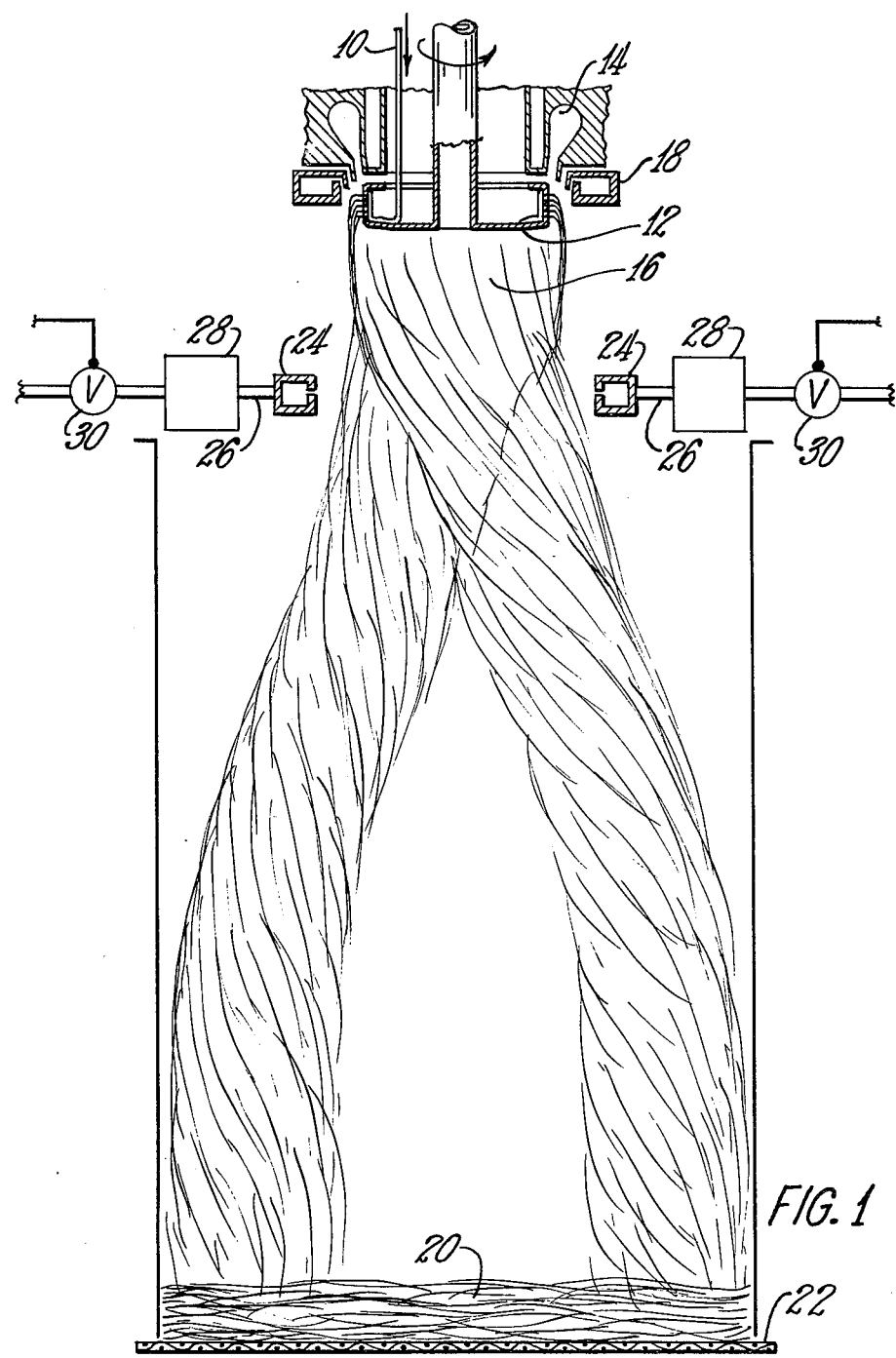
FIG. 1 is a schematic view in elevation of apparatus for collecting a flow of mineral fibers according to the principles of this invention.

As shown in FIG. 1, molten mineral material, such as molten glass 10, is delivered to rotating spinner 12 which fiberizes the glass by centrifugal force. The glass fibers can be maintained in a plastic, attenuable state by annular burner 14. The glass fibers can be turned down into a flow of fibers such as cylindrical veil 16 by annular blower 18. The veil collects as insulation pack 20 on collecting surface 22 which can be a continuous, foraminous conveyor belt. Nozzles 24 are activated periodically to intermittently direct gases into the flow of mineral fibers to uniformly distribute the veil or flow of fibers across the width of the collecting surface. The nozzles can be supplied with air, steam or other gases via supply conduits 26, which can receive the supply of gases from a source, not shown. The supply conduits can be adapted with accumulators 28 to dampen the effect of the pulsation of the gases from the source of the gases. Valves 30 are operated to intermittently interrupt and then reestablish the supply of gases from the source going into the nozzles.

Figure 2:
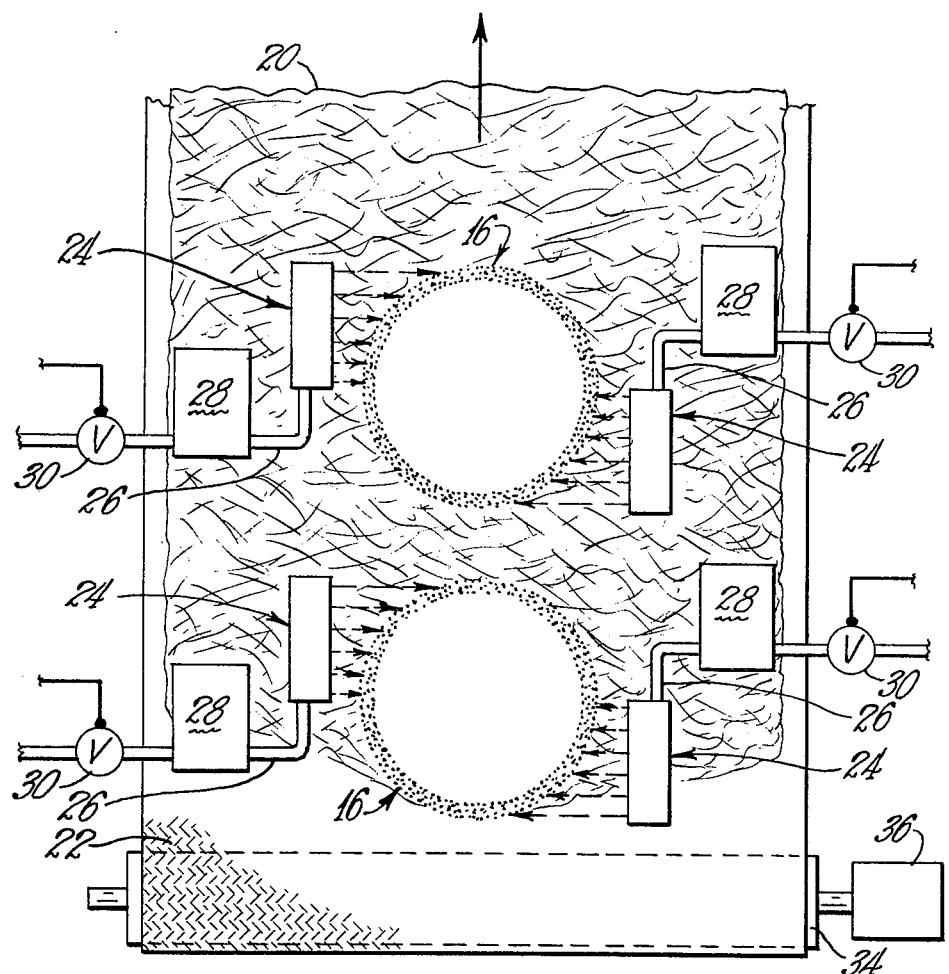
FIG. 2 is a schematic plan view of the system for collecting two veils of mineral fibers according to the principles of the invention.

As shown in FIG. 2, the nozzles can be arranged so that a pair of opposed nozzles is adapted to act upon each veil of a multi-veil fiber forming and fiber distribution system. The dashed arrows indicate the direction of flow of gases from the nozzles. The conveyor can be driven by drive roll 34, which can be powered by any suitable means, such as a motor, not shown. The conveyor can move in the direction of the arrow as indicated at the top of FIG. 2. As the collecting surface travels beneath the two or more fiberizing positions, the fibers accumulate on the collecting surface, forming the insulation pack. A line speed sensor such as tachometer 36 is operably connected to the drive roll to generate a voltage signal corresponding to the drive speed of the colllecting surface. It is to be understood that any other means suitable for generating a signal responsive to the speed of the collecting surface can be used.

Figure 3:
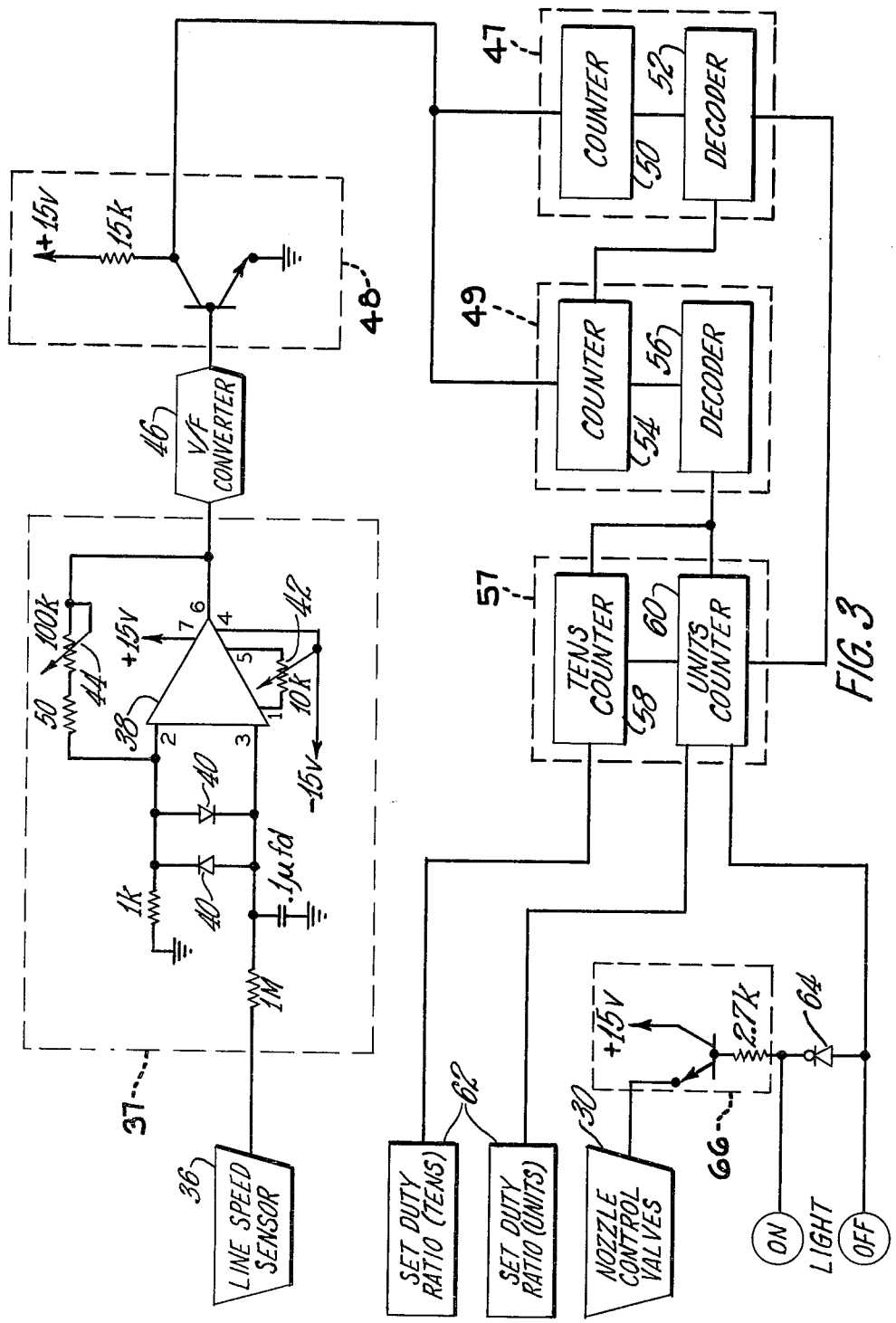
FIG. 3 is an electrical circuit diagram of the controls for the apparatus shown in FIGS. 1 and 2.

As shown in FIG. 3, the voltage signal from the line speed sensor 36 is modified by voltage zero and span circuit 37. The voltage zero and span circuit comprises operational amplifier 38, such as LHOO42H, connected to the input from the line speed sensor via two diodes 40, which are connected in parallel to input terminals 2 and 3 of amplifier 38. The amplifier output is modified by zero-setting 10K potentiometer 42, which is connected to amplifier terminals 1, 4 and 5, and which enables the voltage signal from the line speed sensor to be referenced or zeroed to any desired number. For example, the potentiometer can be set to signal that any line speed sensed as being below a certain voltage would result in an output of zero volts from the operational amplifier. Span-setting 100K potentiometer 44, connected to amplifer terminals 2 and 6, is adapted to enable the setting of the span of the output from the operational amplifier. Thus, the output from the voltage zero and span circuit can be set to a predetermined reference zero, and applied to a predetermined voltage span. In one example of the invention, the input voltage from the tachometer into the voltage zero and span circuit was within the range of from 0 to 100 millivolts, while the output from the voltage zero and span apparatus was within the range of from 0 to 10 volts.

Voltage-to-frequency converter 46 converts the 0 to 10 volt signal of the voltage zero and span circuit into a frequency signal of from 0 to 10 Khz. The V/F converter can be Burr-Brown VFC-12LD, or equivalent. The frequency signal can be shaped and matched to the dividers and counters, hereinafter defined, by amplifier 48. The output from the V/F converter and amplifier 48 is applied to divider 47 and converter 49. The divider converts the signal from an hz signal to a pulse-per-minute signal. The divider can be comprised of counter 50 which can be Motorola MC14040-B and decoder 52 which can be Motorola MC14082-B. The divider supplies a pulse signal within the range of from 0 to 10,000 pulses per minute to pulse counter 57. The converter is adapted to index each 100th pulse coming from the divider. The converter can be comprised of counter 54, which can be Motorola MC14040-B and decoder 56 which can be Motorola MC14082-B.

The pulse counter can be comprised of tens counter 58 and units counter 60, both of which can be Motorola MC14052-B. Duty ratio controls 62 enable the preselection in increments of 1% of the percentage of time the lapper control valves will remain "on" during each pulse from the pulse signal emanating from the pulse counter. For each 100 pulses input from the divider into the pulse counter the nozzle control valves will remain "on" for the number of pulses indicated by the duty ratio controls. For example, when the duty ratio controls are set at 55%, for each 100 pulses entering the pulse counter from the divider the nozzle control valves will remain "on" until the pulse counter counts to 55 pulses, and then the nozzle control valves will be turned "off" for the remaining 45 pulses until the next indexed pulse begins a new cycle. The output signal of the pulse counter is connected through inverter 64 which can be Motorola MC14049-B, to an "on" light and "off" light, and is applied through current amplifier 66, such as ECG123A, to the nozzle control valves. The nozzle control valves control the intermittent flow of gases in response to the output signal from the pulse counter.

EXPLOITATION IN INDUSTRY

The invention will be found to be useful in the formation of fibers from molten glass for such uses as glass fiber thermal insulation products and glass fiber acoustical insulation products.

I claim:

1. Apparatus for collecting mineral fibers comprising:
   a moving surface for receiving a flow of mineral fibers;
   sensing means for sensing the speed of said moving surface and generating a voltage signal therefrom;
   a voltage-to-frequency converter for generating a pulse signal in response to said voltage signal;
   duty ratio control means for controlling the duration of each pulse during each cycle of said pulse signal; and
   means for intermittently directing gases into the flow of mineral fibers in response to said pulse signal.

2. The apparatus of claim 1 in which said duty ratio control means is adapted to enable the pulse duration percentage of the pulse signal to be preselected in increments of 1%.

3. Apparatus for collecting mineral fibers comprising:
   a moving conveyor for receiving mineral fibers from two or more veils of mineral fibers;
   sensing means for sensing the speed of said conveyor and generating a voltage signal therefrom;
   a voltage-to-frequency converter for generating a pulse signal, the frequency of said pulse signal being in response to said voltage signal;
   duty ratio control means for controlling the duration of each pulse during each cycle of said pulse signal; and
   means
   means for intermittently directing gases into said veils of mineral fibers in response to said pulse signal.

4. The apparatus of claim 3 in which said control means comprises means for dividing a frequency signal from pulses/second to pulses/minute.

5. The apparatus of claim 4 comprising means for indexing each 100th pulse from said means for dividing.

6. The apparatus of claim 5 in which said duty ratio control means comprises a pulse counter.

7. The method for collecting mineral fibers comprising:
   directing a flow of mineral fibers onto a moving surface;
   sensing the speed of said moving surface with a tachometer to produce a voltage signal;
   generating a frequency signal in response to the voltage signal;

intermittently directing gases into the flow of mineral fibers in response to said frequency signal.

8. The method for collecting a flow of mineral fibers comprising:

directing two or more veils of mineral fibers onto A moving surface;

sensing the speed of said moving surface with a tachometer to produce a voltage signal;

generating a pulse signal, the frequency of said pulse signal being in response to said voltage signal;

controlling the duration of each pulse during each cycle of said pulse signal; and intermittently directing gases into the veils of mineral fibers in response to said pulse signal.

* * * * *